United States Patent
Benazet et al.

(10) Patent No.: US 7,789,980 B2
(45) Date of Patent: Sep. 7, 2010

(54) PREPARATION OF AMMONIUM DINITROAMIDE (ADN) CRYSTALS, ADN CRYSTALS AND ENERGETIC COMPOSITES CONTAINING THEM

(75) Inventors: Stéphane Benazet, Sainte Genevieve des Bois (FR); Guy Jacob, Vert le Petit (FR)

(73) Assignee: SNPE Materiaux Energetiques, Paris (FR)

( * ) Notice: Subject to any disclaimer, the term of this patent is extended or adjusted under 35 U.S.C. 154(b) by 351 days.

(21) Appl. No.: 11/918,018

(22) PCT Filed: Apr. 11, 2006

(86) PCT No.: PCT/FR2006/050326

§ 371 (c)(1),
(2), (4) Date: Oct. 5, 2007

(87) PCT Pub. No.: WO2006/108991

PCT Pub. Date: Oct. 19, 2006

(65) Prior Publication Data

US 2009/0090441 A1    Apr. 9, 2009

(30) Foreign Application Priority Data

Apr. 12, 2005   (FR) .................................. 05 03618

(51) Int. Cl.
*C06B 31/00*  (2006.01)
*D03D 23/00*  (2006.01)
*D03D 43/00*  (2006.01)

(52) U.S. Cl. ..................................... 149/45; 149/109.6
(58) Field of Classification Search .................. 149/45, 149/109.6
See application file for complete search history.

(56) References Cited

U.S. PATENT DOCUMENTS 6,136,115  A    10/2000  Highsmith et al.

FOREIGN PATENT DOCUMENTS

| | | |
|---|---|---|
| EP | 0 953 555 | 11/1999 |
| EP | 1 331 213 | 7/2003 |
| WO | WO 97/47571 | 12/1997 |

OTHER PUBLICATIONS

International Search Report for International Publication No. PCT/FR2006/050326 dated Nov. 13, 2006.
Teipel et al., "Crystallization of Spherical Ammonium Dinitramide (ADN) Particles", Propellants, Explosives, Pyrotechnics 25, 81-85 (2000) XP008059172.
Malesa et al., "Separation of Ammonium Dinitramide from Reaction Mixture", Propellants, Explosives, Pyrotechnics, 25, 81-85 (2000) XP001095319.

*Primary Examiner*—Jerry Lorengo
*Assistant Examiner*—James E McDonough

(57) ABSTRACT

The present invention relates to a process for the preparation of novel ammonium dinitroamide (ADN) crystals and to said novel ADN crystals. Said novel crystals have an original morphology factor, namely a low shape factor. They are obtained in the presence of at least one crystal habit modifier.

11 Claims, 3 Drawing Sheets

PREPARATION OF AMMONIUM DINITROAMIDE (ADN) CRYSTALS, ADN CRYSTALS AND ENERGETIC COMPOSITES CONTAINING THEM

The present invention relates to a process for the preparation of (novel) ammonium dinitroamide crystals and to the novel ammonium dinitroamide crystals obtainable by said process. The present invention further relates to energetic composites containing such crystals.

Ammonium dinitroamide crystallizes in the space group P $2_1$/a. The crystals of the invention, in this same group, have an original, "modified" crystalline form, which is explained in detail below.

Ammonium dinitroamide has the formula

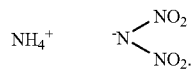

It is more commonly called "ammonium dinitramide" and known under the name "ADN" (Ammonium DiNitramide).

It is known very particularly as a chlorine-free oxidizing charge capable of replacing ammonium perchlorate in propellant compositions.

Various methods of synthesizing said ADN have been proposed (they have been referred to by Wang Guogiang, Chen Hong and Ma Yuanying in Theory Pract. Energ. Mater. [Proc. Int. Autumn Semin. Propellants, Explos. Pyrotech.] (1996) 85-91 (Chemical Abstract: 126: 106102)).

Two of these methods are mainly used:

the so-called urethane method: the nitration and the treatment of urethane yield the ammonium salt of N-nitrourethane (ANU). This salt is then nitrated with $N_2O_5$ in a continuous reaction to form the N,N-dinitro derivative, which is not isolated but reacted directly with ammonia to form ADN and regenerate the urethane;

the so-called sulfamate method: ammonium or potassium sulfamate is nitrated with a sulfonitric mixture at low temperature and the reaction medium is then neutralized and generally concentrated.

After either one of these methods of synthesis, the ADN, obtained in solution, is crystallized in conventional manner (by concentration, by the addition of a non-solvent and/or by cooling, etc.). To obtain a chemically purer ADN, Malesa et al. recommended recrystallization (Propellants, Explosives, Pyrotechnics, 24, 83-89 (1999)).

Figure 1:
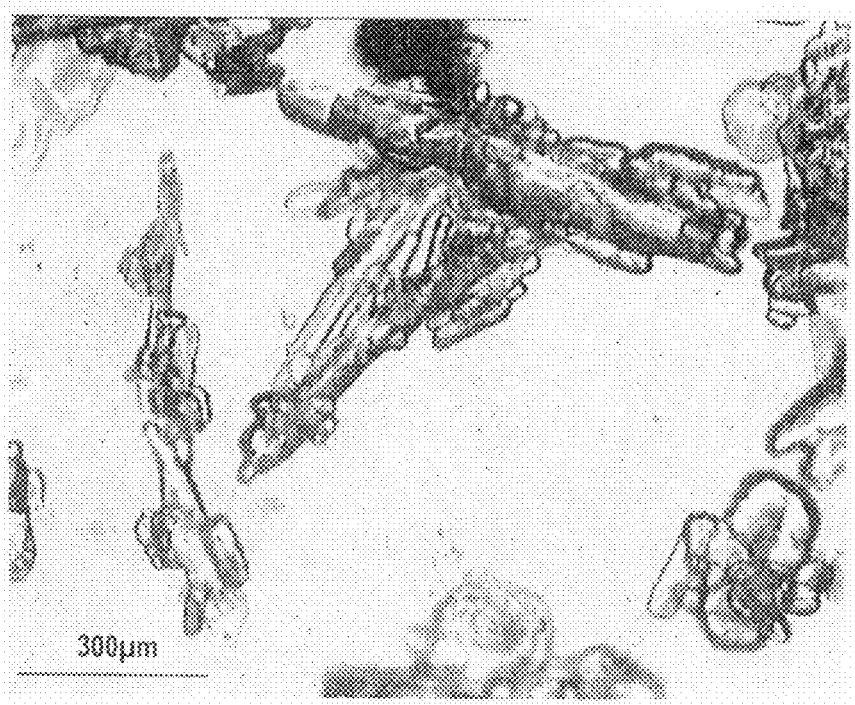
Figure 2:
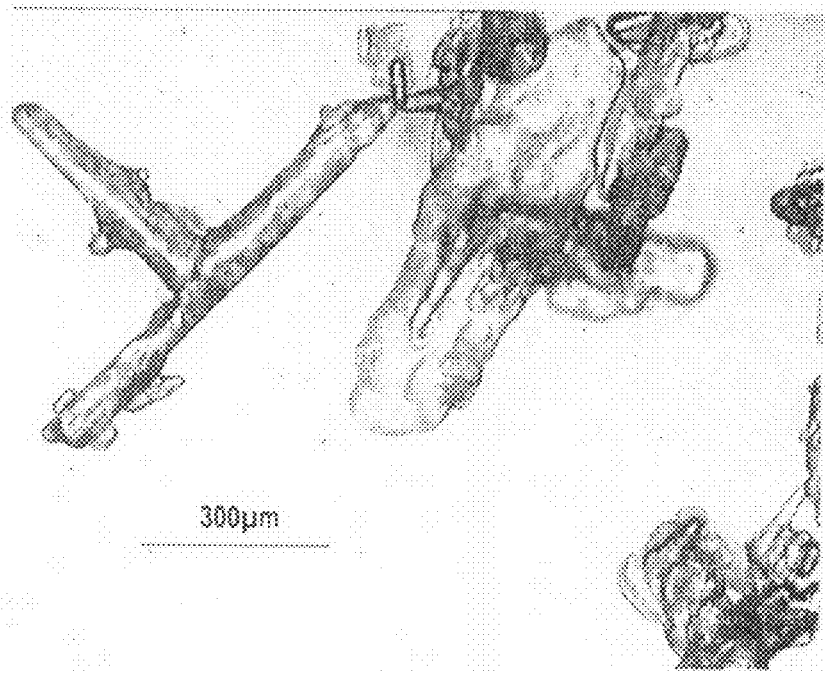

The resulting crystals of crude ADN take the form of small rods, or even of needles, characterized by a high shape factor (this conventional parameter of crystals is defined as the ratio of their largest dimension to their smallest dimension). Such small rods or needles are shown in FIGS. 1 and 2 (photographs taken with an optical transmission microscope). They have a shape factor of about 10.

Such a crystal morphology makes ADN unsuitable for formulation, the feasibility of the compositions being greatly compromised due to the large increase in viscosity as soon as high loading rates are envisaged.

Furthermore, those skilled in the art are aware that the crystals of crude ADN obtained hitherto are relatively hygroscopic.

With reference to the above-mentioned technical problem of formulating crystals of crude ADN, it has been recommended to convert said crystals to beads (EP-A-1 331 213; Propellants, Explosives, Pyrotechnics, 25, 81-85 (2000); EP-A-0 953 555; WO-A-97/47571; U.S. Pat. No. 6,136,115; WO-A-99/21794 and WO-A-99/01408). Those skilled in the art employ the term "prills". Said "prills" (said beads) are generally obtained either by melting the ADN in a non-solvent liquid, with vigorous agitation, and then cooling rapidly, or by using a "prilling" tower in which the molten ADN is sprayed into a stream of gas.

The first of these techniques, termed "prilling in suspension", is described in particular in patent application WO-A-99/21794, and the second in patent applications WO-A-97/47571 and WO-A-99/01408.

Neither of these techniques is completely satisfactory:

"prilling in suspension" is difficult to extrapolate beyond a few kilograms per batch because of the heat exchanges with the jacket of the reactor in which it is carried out. Said heat exchanges limit the cooling rate. This problem is the more critical, the larger the reactor.

"prilling" in a tower involves the handling of molten ADN, even though this compound is known to be unstable above its melting point. Phenomena of local superheating or accumulation of material are liable to cause accidents.

Whatever the case may be, said techniques are relatively difficult methods of converting ADN previously obtained by crystallization.

In such a context, with reference to the technical problem of formulating ADN crystals, the Applicant proposes a totally original solution. This solution is based not on converting the crude crystals obtained, but on modifying the process for obtaining the crystals (crystallization process); it is based on generating crystals with an original shape that is more suitable for their formulation, particularly at high concentrations. Said original crystal shape can be analyzed as a modified crystal shape (compared with the known crystal shape characterized by a high shape factor), but it should be understood that the modification results from an (upstream) modification of the crystallization process and not from a (downstream) modification of crystals obtained by the crystallization process of the prior art.

The modification of a crystallization process to generate crystals in an original shape is not in itself an innovative operation. This type of operation, based on the intervention of crystal growth modifiers, has been used in particular in processes for the preparation of edible sugars. However, to the Applicant's knowledge, it has never been described in the context of ADN with reference to the technical problem of its formulation.

In this particular context, the inventors have shown, totally surprisingly, that it is possible to intervene in the crystallization of ADN so as to reduce the shape factor of the crystals, and that crystallization additives exist which modify the growth of the ADN crystals and which:

+ are soluble in the ADN crystallization solvents;

+ are high-performance, i.e. are capable of adsorbing preferentially onto (and desorbing from) the faces which have the highest growth rate and which are therefore present at the ends of the rods or needles;

+ and only slightly affect, if at all, the nature and hence the performance characteristics and the properties of said ADN, as well as its compatibility with partners (co-constituents) in the framework of its use in energetic composites of the propellant or explosive type.

In its process and product features, the present invention is based on the use of (crystallization) additives which modify the crystal habit of the ADN. It is to the inventors' credit to have transferred the concept of modifying the crystallization process to the context of the crystallization of ADN and to have identified high-performance crystallization modifiers in this context.

The present invention relates firstly to a process for the preparation of ammonium dinitroamide (ammonium dinitramide=ADN) crystals from a solution containing said ADN in a solvent. Characteristically, said process comprises:

the addition, to said solution, of an effective and non-excessive amount of at least one crystal habit modifier capable of reducing the shape factor of the crystals; and the implementation of crystallization, in said solution containing said at least one crystal habit modifier, by any appropriate treatment.

The crystallization is carried out in conventional manner (in particular by increasing the concentration of ADN in the solution (e.g. following evaporation of the solvent), and/or by adding a non-solvent for the ADN to said solution, and/or by cooling said solution; it is advantageous to implement one of these methods, but it is not excluded to implement at least two of them, successively or conjointly; those skilled in the art master the implementation of these crystallization techniques perfectly) on a solution which characteristically contains, apart from the dissolved ADN, an effective and non-excessive amount of at least one crystal habit modifier. Said at least one crystal habit modifier is suitable for reducing the shape factor of the crystals. Said at least one crystal habit modifier is advantageously selected from the salts of alkaline earth metal cations. This is explained more thoroughly in the present description.

The solvent of the solution is selected from the known ADN crystallization solvents. It can consist especially of an alcohol, acetone, acetonitrile or a mixture of these solvents. It is advantageously selected from alcohols and mixtures thereof. The use of ethanol/methanol mixtures is very particularly recommended.

Said at least one crystal habit modifier is used in an effective and non-excessive amount.

With reference to efficacy, the amount used is:

generally at least 0.005% by weight, based on the weight of ADN in solution (dissolved ADN);

advantageously at least 0.01% by weight, based on the weight of ADN in solution;

very advantageously at least 0.1% by weight, based on the weight of ADN in solution.

The crystal habit modifier is advantageously effective in small amounts and is therefore used in small amounts. This minimizes the risk of contaminating the crystals, modifying the properties of said crystals, etc.

With reference to these problems, care is taken to ensure that said crystal habit modifier is not used in excessive amounts. It is generally used in an amount of less than 5% by weight, based on the weight of ADN in solution, and advantageously in an amount of at most 3% by weight, based on the weight of ADN in solution.

Those skilled in the art are capable of optimizing the amount of said at least one crystal habit modifier used within the framework of the implementation of the process of the invention.

With reference to the nature of said at least one crystal habit modifier, it has been seen that it is advantageously selected from the salts of alkaline earth metal cations.

In fact, it is very advantageously selected from calcium and magnesium salts.

The nature of the anion of the salt in question has little influence on the expected function of modifying the growth of the ADN crystals. Thus it is possible a priori to use any calcium or magnesium salt. Two long but not exhaustive lists of salts are proposed below, one of calcium salts and the other of magnesium salts, which are very particularly suitable (for practical reasons) for the purposes of carrying out the process of the invention.

Calcium Salts:

| Name | Formula |
|---|---|
| calcium butyrate | $Ca(C_4H_7O_2)_2 \cdot H_2O$ |
| calcium carbonate | $CaCO_3$ |
| calcium perchlorate | $Ca(ClO_4)_2$ |
| calcium chloride | $CaCl_2$ |
| calcium cinnamate | $Ca(C_9H_7O_2)_2 \cdot 3H_2O$ |
| calcium citrate | $Ca(C_6H_5O_7)_2 \cdot 4H_2O$ |
| calcium formate | $Ca(CHO_2)_2$ |
| calcium fumarate | $CaC_4H_2O_4 \cdot 3H_2O$ |
| calcium d-gluconate | $Ca(C_6H_{11}O_7)_2 \cdot H_2O$ |
| calcium glycerophosphate | $CaC_3H_5(OH)_2PO_4$ |
| calcium isobutyrate | $Ca(C_4H_7O_2)_2 \cdot 5H_2O$ |
| calcium lactate | $Ca(C_3H_5O_3)_2 \cdot 5H_2O$ |
| calcium laurate | $Ca(C_{12}H_{23}O_2)_2 \cdot H_2O$ |
| calcium linoleate | $Ca(C_{18}H_{31}O_2)_2$ |
| calcium malate | $CaC_4H_4O_5 \cdot 2H_2O$ |
| calcium dihydrogen malate | $Ca(HC_4H_4O_5)_2 \cdot 6H_2O$ |
| calcium maleate | $CaC_4H_2O_4 \cdot H_2O$ |
| calcium malonate | $CaC_3H_2O_4 \cdot 4H_2O$ |
| calcium α-methylbutyrate | $Ca(C_5H_9O_2)_2$ |
| calcium nitrate | $Ca(NO_3)_2$ |
| calcium oleate | $Ca(C_{18}H_{33}O_2)_2$ |
| calcium oxalate | $CaC_2O_4$ |
| calcium palmitate | $Ca(C_{16}H_{31}O_2)_2$ |
| calcium 1-phenol-4-sulfonate | $Ca[C_6H_4(OH)SO_3]_2 \cdot H_2O$ |
| calcium hypophosphate | $Ca_2P_2O_6 \cdot 2H_2O$ |
| calcium metaphosphate | $Ca(PO_3)_2$ |
| calcium di(sec)orthophosphate | $CaHPO_4 \cdot 4H_2O$ |
| calcium mono(prim)orthophosphate | $Ca(H_2PO_4)_2 \cdot H_2O$ |
| calcium tri(tert)orthophosphate | $Ca_3(PO_4)_2 \cdot H_2O$ |
| calcium hypophosphite | $Ca(H_2PO_2)_2$ |
| calcium diorthophosphite | $2CaHPO_3 \cdot 3H_2O$ |
| calcium propionate | $Ca(C_3H_5O_2)_2 \cdot H_2O$ |
| calcium 1-quinate | $Ca(C_7H_{11}O_6)_2 \cdot 10H_2O$ |
| calcium salicylate | $Ca(C_7H_5O_3)_2 \cdot 2H_2O$ |
| calcium metasilicate | $CaSiO_3$ |
| calcium diorthosilicate | $Ca_2SiO_4$ |
| calcium silicate | $Ca_3SiO_5$ or $(3CaO \cdot SiO_2)$ |
| calcium stearate | $Ca(C_{18}H_{35}O_2)_2$ |
| calcium succinate | $CaC_4H_6O_4 \cdot 3H_2O$ |
| calcium sulfate | $CaSO_4$ |
| calcium tartrate | $CaC_4H_4O_6 \cdot 4H_2O$ |
| calcium valerate | $Ca(C_5H_9O_2)_2$ |

Magnesium Salts:

| Name | Formula |
|---|---|
| magnesium acetate | $Mg(C_2H_3O_2)_2$ |
| magnesium benzoate | $Mg_3(C_7H_5O_2)_2 \cdot 3H_2O$ |
| magnesium bismuth nitrate | $3Mg(NO_3)_2 \cdot 2Bi(NO_3)_2 \cdot 24H_2O$ |
| magnesium diborate | $Mg_2B_2O_4 \cdot H_2O$ |
| magnesium metaborate | $Mg(BO_2)_2 \cdot 3H_2O$ |
| magnesium orthoborate | $Mg_3(BO_3)_2$ |
| magnesium carbonate | $MgCO_3$ |
| magnesium perchlorate | $Mg(ClO_4)_2$ |
| magnesium chloride | $MgCl_2$ |
| magnesium mono-H-citrate | $MgHC_6H_5O_7 \cdot 5H_2O$ |
| magnesium formate | $Mg(CHO_2)_2 \cdot 2H_2O$ |
| magnesium lactate | $Mg(C_3H_5O_3)_2 \cdot 3H_2O$ |
| magnesium laurate | $Mg(C_{12}H_{23}O_2)_2 \cdot 2H_2O$ |
| magnesium myristate | $Mg(C_{14}H_{27}O_2)_2$ |
| magnesium nitrate | $Mg(NO_3)_2$ |
| magnesium oleate | $Mg(C_{18}H_{33}O_2)_2$ |
| magnesium oxalate | $MgC_2O_4 \cdot 2H_2O$ |
| magnesium palmitate | $Mg(C_{16}H_{31}O_2)_2$ |
| magnesium orthophosphate | $Mg_3(PO_4)_2$ |

-continued

| Name | Formula |
|---|---|
| magnesium mono-H-orthophosphate | $MgHPO_4·3H_2O$ |
| magnesium salicylate | $Mg(C_7H_5O_3)_2·4H_2O$ |
| magnesium stearate | $Mg(C_{18}H_{35}O_2)_2$ |
| magnesium sulfate | $MgSO_4$ |
| magnesium d-tartrate | $MgC_4H_4O_6·5H_2O$ |
| magnesium hydrogen d-tartrate | $Mg(HC_4H_4O_6)_2·4H_2O$ |
| magnesium thiosulfate | $MgS_2O_3·6H_2O$ |

It is very particularly recommended to carry out the process of the invention using calcium carbonate ($CaCO_3$), calcium nitrate ($Ca(NO_3)_2$) or a mixture of these two salts ($CaCO_3$+$Ca(NO_3)_2$) as the crystal habit modifier.

The invention relates secondly to the ADN crystals obtainable by the process described above ("modified" crystallization process by virtue of the presence of at least one crystal habit modifier during its implementation).

Said crystals have an original shape and a different crystal habit from that of the crystals of the prior art, obtained by the "unmodified" crystallization process. Said crystals are characterized by a smaller shape factor than that of said crystals of the prior art. The growth of said crystals has been impeded.

Within the framework of its second subject, the present invention relates to ADN crystals characterized by a shape factor less than or equal to 5 and more particularly to ADN crystals characterized by a shape factor of between 1.5 and 5 (the values of 1.5 and 5 being inclusive).

Such crystals have never been described to date.

On reading the above, those skilled in the art will already have understood the great value of these ADN crystals for use in the production of energetic composites, especially of the propellant or explosive type.

The invention relates thirdly to energetic composites containing energetic charges in an energetic or non-energetic binder, at least part of said energetic charges consisting of crystals as described above and/or as obtained by the process described above.

Said composites can contain a high proportion of said crystals, in any case a greater proportion than that contained in crystals of the prior art. Modification of the crystal habit removes some of the problems of steric hindrance.

Thus the energetic composites of the invention contain advantageously more than 30% and very advantageously more than 50% by weight of said crystals. They are capable a priori of containing up to about 70% thereof.

Those skilled in the art will already have understood the whole value of the invention.

The proposed modified crystallization is a simple, easily extrapolable operation whose implementation does not require special equipment and does not present any particular pyrotechnic hazard. Furthermore, it can be carried out in inexpensive and non-toxic solvents. Said crystallization is thus much more valuable than the "prilling" techniques referred to in the introduction of the present text.

Said proposed modified crystallization affords ADN crystals of particular value in that they make it possible to use said ADN in energetic composites with high loading rates. Furthermore, said ADN crystals are less hygroscopic than those of the prior art.

It is now proposed to illustrate the invention, in its process and product features, by means of the Examples below.

The attached Figures are photographs taken with an optical transmission microscope.

As already specified, FIGS. 1 and 2 show ADN crystals of the prior art, of the "small rod" or "needle" type.

Figure 3:
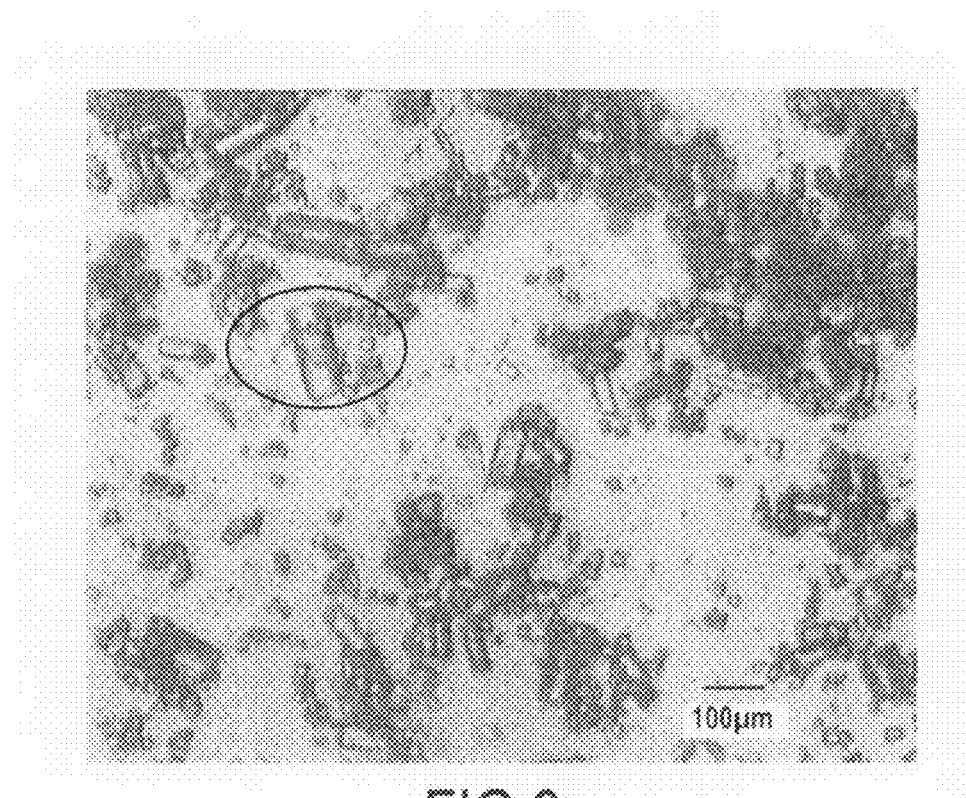
Figure 4:
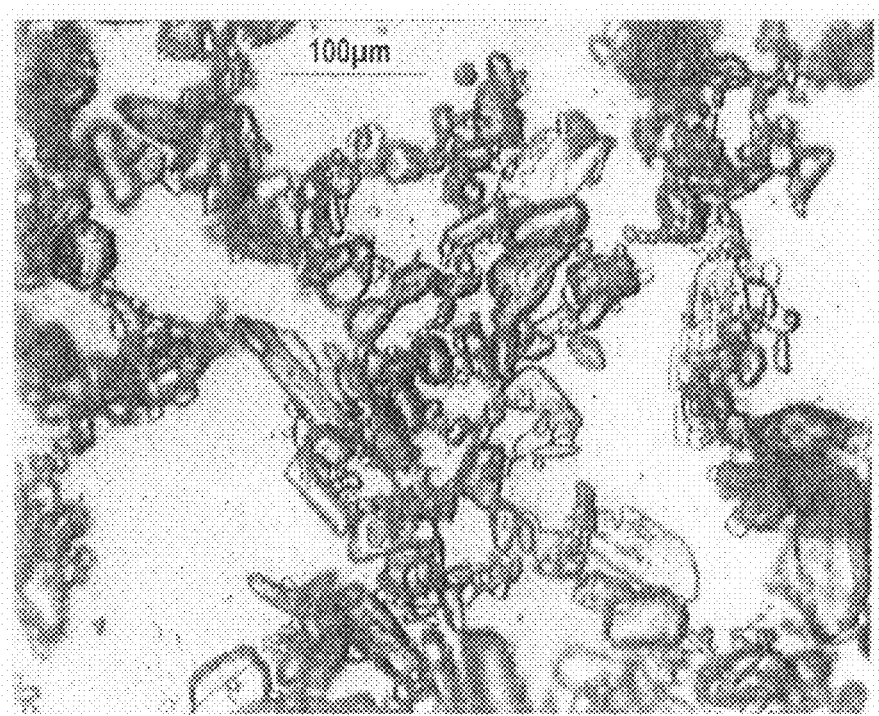
Figure 5:
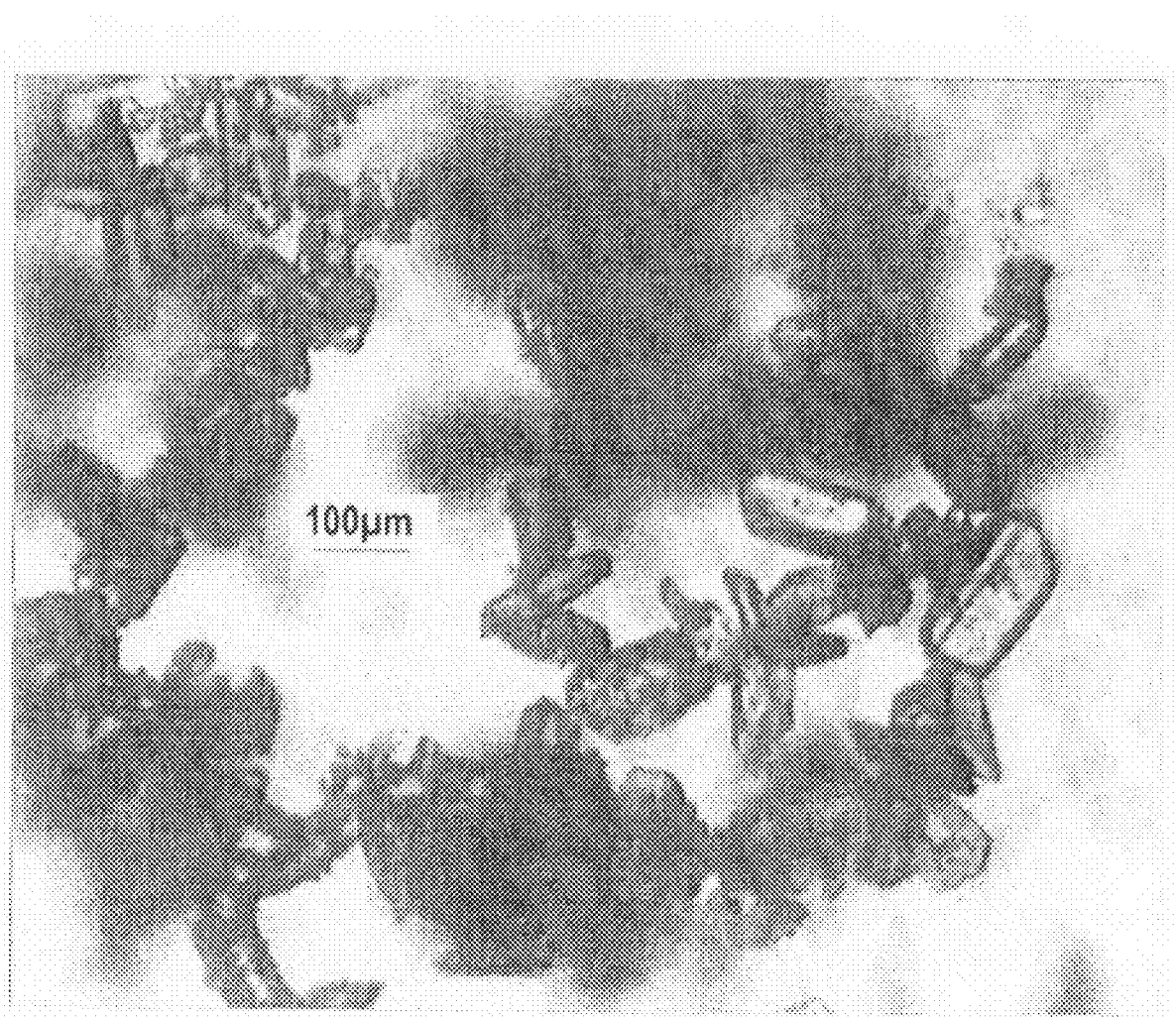

FIGS. 3, 4 and 5 show ADN crystals of the invention obtained after carrying out Examples 6, 7 and 8 respectively.

The scales are indicated on each of said Figures. It is clearly apparent that the crystals of the invention have a smaller shape factor than the crystals of the prior art.

The crystal encircled in FIG. 5 has a mean diameter of 150 µm.

Crystals of the invention were obtained by the following procedure, which is specified with reference to Example 9.

Procedure: Example 9

The reactor used is a 750 ml jacketed reactor.

It is equipped with a bulb condenser, the end of which is connected to a drying system (silica gel crystals).

The temperature in the medium is controlled with the aid of a temperature probe and regulated by a fluid circulating in the jacket.

The stirring of the reaction medium (with a water propeller) is assured by an electrical system.

All the glassware used is dried beforehand. The crystallization system (reactor+condenser) is also dried with a warm air gun.

The following are introduced into the reactor (round-bottomed flask) at room temperature: 400 ml of ethanol (stored over a molecular sieve) and then 200 g of ADN (dried beforehand under vacuum with silica gel crystals). This is followed by rinsing with 100 ml of ethanol. The stirrer is started (600 rpm), 100 g of ADN are then introduced, with stirring, and a solution (60 ml) of methanol (stored over a molecular sieve) containing the growth modifier (1.5 g of $Ca(NO_3)_2$+1.5 g of $CaCO_3$) is added, representing 1% of the weight of ADN. This is followed by rinsing with 100 ml of ethanol.

The mixture is heated at 65° C. for 45 min, with stirring, until dissolution is complete.

The stirrer is set to 400 rpm and the following cooling gradient is applied: cooling from 60° to 30° C. in 45 min, followed by a temperature plateau at 30° C. for 30 min and then by further cooling from 30° to 20° C. (or room temperature) in 1 h 45 min.

The suspension is filtered on a Büchner funnel (standard filter paper) and then placed in an oven at 40° C. for 2 h. About 240 g of ADN with a mean crystal diameter of 245 µm (wide distribution from 50 to 440 µm) are collected. The crystals have the appearance of white crystallized sugar.

Said procedure was repeated under similar conditions and afforded the results given in the Table below (Examples 1 to 8).

TABLE

| Ex. no. | Wt. of ADN (g) | Vol. of EtOH (ml) | Vol. of MeOH (ml) | Initial [ADN] (g/l) | Solubility of ADN (a) (g/l) | Wt. of additive (g) | Amount of additive (b) (%) | Stirring (rpm) | Initial temp. (° C.) | Final temp. (° C.) | Cooling, duration (h) and type |
|---|---|---|---|---|---|---|---|---|---|---|---|
| 1 | 3.63 | 9 | 1 | 363 | 420 | 0.100 (e) | 3 | 300 (c) | 45 | 16 | 3 thermoregulated |
| 2 | 13.17 | 21 | 2 | 572 | 663 | 0.070 (e) | 0.5 | 300 (c) | 61 | 19 | 1 free |
| 3 | 5.89 | 18 | 2 | 294 | 363 | 0.036 (e) | 0.6 | 300 (c) | 40 | 18 | 6 linear |
| 4 | 5.89 | 18 | 2 | 294 | 363 | 0.036 (e) | 0.6 | 300 (c) | 40 | 18 | 6 in 4 regular steps |

TABLE-continued

| Ex. no. | Wt. of ADN (g) | Vol. of EtOH (ml) | Vol. of MeOH (ml) | Initial [ADN] (g/l) | Solubility of ADN (a) (g/l) | Wt. of additive (g) | Amount of additive (b) (%) | Stirring (rpm) | Initial temp. (° C.) | Final temp. (° C.) | Cooling, duration (h) and type | |
|---|---|---|---|---|---|---|---|---|---|---|---|---|
| 5 | 5.99 | 18 | 2 | 299 | 363 | 0.036 (e) | 0.6 | 1000 (c) | 40 | 18 | 5.5 | in 5 steps |
| 6 | 93.16 | 240 | 30 | 345 | 420 | 2.955 (e) | 3 | 400 (c) | 45 | 22 | 5.5 | in 5 steps |
| 7 | 9.47 | 27 | 3 | 316 | 363 | 0.010 (e) | 0.1 | 400 (c) | 40 | 18 | 3.75 | in 4 steps |
| 8 | 300.0 | 600 | 60 | 455 | 663 | 3.00 (f) | 1 | 600 (d) | 60 | 20 | 3 | in 1 step |
| 9 | 300.0 | 600 | 60 | 455 | 663 | 3.00 (f) | 1 | 400 (d) | 60 | 20 | 3 | in 1 step |

Experimental conditions of ADN crystallization in the presence of additive.
(a) in pure ethanol at the initial temperature,
(b) based on the weight of ADN introduced,
(c) magnetic bar,
(d) water propeller,
(e) additive = $CaCO_3$,
(f) additive = 50/50 (by weight) mixture of $CaCO_3$ and $Ca(NO_3)_2$ Crystals obtained according to the prior art (chemically purified, crude ADN) and crystals of the invention (those obtained according to Example 6) were used to make explosive pastes. Said crystals originate from one and the same production batch (in fact, the crystals of the invention are obtained after dissolution of the crystals of the prior art and recrystallization in the presence of a growth modifier).

Said pastes have the following composition by weight:

43% of ADN

12% of PBHT binder

20% of hexogen and

25% of aluminum.

The paste containing the crystals of the prior art has a viscosity of 10.2 kPoise, whereas the one containing the crystals of the invention has a viscosity of 5.6 kPoise. The whole value of the present invention is evident from a consideration of these figures.

Crystals obtained according to the prior art (chemically purified, crude ADN) and crystals of the invention (those obtained according to Example 9) were tested for their hygroscopic properties. Said crystals originate from one and the same production batch (in fact, the crystals of the invention are obtained after dissolution of the crystals of the prior art and recrystallization in the presence of growth modifiers).

The moisture uptake was measured with the aid of a high precision balance located in an enclosure with controlled relative humidity. After a 25 h drying phase, the moisture uptake (dm/m0) is lower for the ADN crystallized according to the invention than for the ADN crystallized in conventional manner. After 5 h at a relative humidity (RH) of 65%, the ADN with the modified morphology factor offers a practical use prolonged by about 3 h compared with the ADN which has not been crystallized by the novel process (purified, crude): the water uptake kinetics are slowed down.

The invention claimed is:

1. A process for the preparation of ammonium dinitroamide (ADN) crystals from a solution containing said ADN in a solvent, comprising:
   including an effective and non-excessive amount of at least one crystal habit modifier capable of reducing the shape factor of the crystals in the solution; and
   performing crystallization in said solution containing said at least one crystal habit modifier by any appropriate treatment.

2. The process according to claim 1 wherein said crystallization is carried out by at least one selected from the group consisting of increasing the concentration of ADN in said solution, adding a non-solvent for ADN to said solution, and cooling said solution.

3. The process according to claim 1 wherein the solvent of said solution is selected from alcohols and mixtures thereof.

4. The process according to claim 1 wherein said effective and non-excessive amount is greater than or equal to 0.005% by weight based on the weight of ADN in solution.

5. The process according to claim 1 wherein said effective and non-excessive amount is greater than or equal to 0.01% by weight.

6. The process according to claim 1 wherein said effective and non-excessive amount is greater than or equal to 0.1% by weight.

7. The process according to claim 1 wherein said effective and non-excessive amount is less than 5% by weight, based on the weight of ADN in solution.

8. The process according to claim 1 wherein said at least one crystal habit modifier is selected from the salts of alkaline earth metal cations.

9. The process according to claim 1 wherein said at least one crystal habit modifier is selected from calcium and/or magnesium salts.

10. The process according to claim 1 wherein said at least one crystal habit modifier is selected from the following calcium salts:

| Name | Formula |
|---|---|
| calcium butyrate | $Ca(C_4H_7O_2)_2 \cdot H_2O$ |
| calcium carbonate | $CaCO_3$ |
| calcium perchlorate | $Ca(ClO_4)_2$ |
| calcium chloride | $CaCl_2$ |
| calcium cinnamate | $Ca(C_9H_7O_2)_2 \cdot 3H_2O$ |
| calcium citrate | $Ca(C_6H_5O_7)_2 \cdot 4H_2O$ |
| calcium formate | $Ca(CHO_2)_2$ |
| calcium fumarate | $CaC_4H_2O_4 \cdot 3H_2O$ |
| calcium d-gluconate | $Ca(C_6H_{11}O_7)_2 \cdot H_2O$ |
| calcium glycerophosphate | $CaC_3H_5(OH)_2PO_4$ |
| calcium isobutyrate | $Ca(C_4H_7O_2)_2 \cdot 5H_2O$ |
| calcium lactate | $Ca(C_3H_5O_3)_2 \cdot 5H_2O$ |
| calcium laurate | $Ca(C_{12}H_{23}O_2)_2 \cdot H_2O$ |
| calcium linoleate | $Ca(C_{18}H_{31}O_2)_2$ |
| calcium malate | $CaC_4H_4O_5 \cdot 2H_2O$ |
| calcium dihydrogen malate | $Ca(HC_4H_4O_5)_2 \cdot 6H_2O$ |
| calcium maleate | $CaC_4H_2O_4 \cdot H_2O$ |
| calcium malonate | $CaC_3H_2O_4 \cdot 4H_2O$ |
| calcium α-methylbutyrate | $Ca(C_5H_9O_2)_2$ |
| calcium nitrate | $Ca(NO_3)_2$ |
| calcium oleate | $Ca(C_{18}H_{33}O_2)_2$ |
| calcium oxalate | $CaC_2O_4$ |

-continued

| Name | Formula |
| --- | --- |
| calcium palmitate | $Ca(C_{16}H_{31}O_2)_2$ |
| calcium 1-phenol-4-sulfonate | $Ca[C_6H_4(OH)SO_3]_2 \cdot H_2O$ |
| calcium hypophosphate | $Ca_2P_2O_6 \cdot 2H_2O$ |
| calcium metaphosphate | $Ca(PO_3)_2$ |
| calcium di(sec)orthophosphate | $CaHPO_4 \cdot 4H_2O$ |
| calcium mono(prim)orthophosphate | $Ca(H_2PO_4)_2 \cdot H_2O$ |
| calcium tri(tert)orthophosphate | $Ca_3(PO_4)_2 \cdot H_2O$ |
| calcium hypophosphite | $Ca(H_2PO_2)_2$ |
| calcium diorthophosphite | $2CaHPO_3 \cdot 3H_2O$ |
| calcium propionate | $Ca(C_3H_5O_2)_2 \cdot H_2O$ |
| calcium l-quinate | $Ca(C_7H_{11}O_6)_2 \cdot 10H_2O$ |
| calcium salicylate | $Ca(C_7H_5O_3)_2 \cdot 2H_2O$ |
| calcium metasilicate | $CaSiO_3$ |
| calcium diorthosilicate | $Ca_2SiO_4$ |
| calcium silicate | $Ca_3SiO_5$ or $(3CaO \cdot SiO_2)$ |
| calcium stearate | $Ca(C_{18}H_{35}O_2)_2$ |
| calcium succinate | $CaC_4H_6O_4 \cdot 3H_2O$ |
| calcium sulfate | $CaSO_4$ |
| calcium tartrate | $CaC_4H_4O_6 \cdot 4H_2O$ |
| calcium valerate | $Ca(C_5H_9O_2)_2$ | and the following magnesium salts:

| Name | Formula |
| --- | --- |
| magnesium acetate | $Mg(C_2H_3O_2)_2$ |
| magnesium benzoate | $Mg_3(C_7H_5O_2)_2 \cdot 3H_2O$ |
| magnesium bismuth nitrate | $3Mg(NO_3)_2 \cdot 2Bi(NO_3)_2 \cdot 24H_2O$ |
| magnesium diborate | $Mg_2B_2O_4 \cdot H_2O$ |
| magnesium metaborate | $Mg(BO_2)_2 \cdot 3H_2O$ |
| magnesium orthoborate | $Mg_3(BO_3)_2$ |
| magnesium carbonate | $MgCO_3$ |
| magnesium perchlorate | $Mg(ClO_4)_2$ |
| magnesium chloride | $MgCl_2$ |
| magnesium mono-H-citrate | $MgHC_6H_5O_7 \cdot 5H_2O$ |
| magnesium formate | $Mg(CHO_2)_2 \cdot 2H_2O$ |
| magnesium lactate | $Mg(C_3H_5O_3)_2 \cdot 3H_2O$ |
| magnesium laurate | $Mg(C_{12}H_{23}O_2)_2 \cdot 2H_2O$ |
| magnesium myristate | $Mg(C_{14}H_{27}O_2)_2$ |
| magnesium nitrate | $Mg(NO_3)_2$ |
| magnesium oleate | $Mg(C_{18}H_{33}O_2)_2$ |
| magnesium oxalate | $MgC_2O_4 \cdot 2H_2O$ |
| magnesium palmitate | $Mg(C_{16}H_{31}O_2)_2$ |
| magnesium orthophosphate | $Mg_3(PO_4)_2$ |
| magnesium mono-H-orthophosphate | $MgHPO_4 \cdot 3H_2O$ |
| magnesium salicylate | $Mg(C_7H_5O_3)_2 \cdot 4H_2O$ |
| magnesium stearate | $Mg(C_{18}H_{35}O_2)_2$ |
| magnesium sulfate | $MgSO_4$ |
| magnesium d-tartrate | $MgC_4H_4O_6 \cdot 5H_2O$ |
| magnesium hydrogen d-tartrate | $Mg(HC_4H_4O_6)_2 \cdot 4H_2O$ |
| magnesium thiosulfate | $MgS_2O_3 \cdot 6H_2O$. |

11. The process according to claim 1 wherein said at least one crystal habit modifier is selected from calcium carbonate ($CaCO_3$), calcium nitrate ($Ca(NO_3)_2$) and mixtures thereof ($CaCO_3+Ca(NO_3)_2$).

\* \* \* \* \*